(12) United States Patent
Furuta et al.

(10) Patent No.: US 9,443,653 B2
(45) Date of Patent: Sep. 13, 2016

(54) RARE EARTH MAGNET, ROTOR AND MANUFACTURING METHOD FOR RARE EARTH MAGNET

(71) Applicant: NIDEC SANKYO CORPORATION, Nagano (JP)

(72) Inventors: Yoshifumi Furuta, Nagano (JP); Yasushi Mizusaki, Nagano (JP); Katsuyoshi Furuya, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 11 days.

(21) Appl. No.: 14/282,473

(22) Filed: May 20, 2014

(65) Prior Publication Data

US 2014/0354100 A1    Dec. 4, 2014

(30) Foreign Application Priority Data

May 28, 2013   (JP) .................. 2013-112250

(51) Int. Cl.
*H01F 41/02* (2006.01)
*H01F 41/00* (2006.01)
*H01F 7/02* (2006.01)
(Continued)

(52) U.S. Cl.
CPC ............. *H01F 41/026* (2013.01); *H01F 7/02* (2013.01); *H01F 41/005* (2013.01); *H01F 41/0253* (2013.01); *H01F 7/0221* (2013.01);
(Continued)

(58) Field of Classification Search
CPC ... H02K 1/27; H01F 41/005; H01F 41/0253; H01F 41/026; H01F 7/02; Y10T 29/49075

USPC ....... 310/156.01; 419/66, 35, 41, 38, 44, 45, 419/46, 62, 63, 64, 67; 335/302; 29/602.1, 29/603.13, 603.14, 607; 427/127–131
See application file for complete search history.

(56) References Cited

U.S. PATENT DOCUMENTS

| 4,865,915 A * | 9/1989 | Okonogi et al. .............. 428/336 |
| 5,089,066 A * | 2/1992 | Hamada et al. .............. 148/302 |
| 6,001,272 A * | 12/1999 | Ikuma et al. .............. 252/62.54 |
| 6,387,293 B1 * | 5/2002 | Akioka et al. ............. 252/62.54 |

(Continued)

FOREIGN PATENT DOCUMENTS

| JP | 2879645 A | 1/1999 |
| JP | 11-238611 A | 8/1999 |
| JP | 11238611 A * | 8/1999 |

OTHER PUBLICATIONS

Sakamoto Manabu; Kuwazawa Takafumi; Kobayashi Toshimasa; Process for Rust Prevention of Rare Earth Permanent Magnet, Aug. 8, 1999, Sankyo Seiki Seisakusho, JPH 11238611.*

*Primary Examiner* — Terrance Kenerly
*Assistant Examiner* — Alexander Singh
(74) *Attorney, Agent, or Firm* — Cantor Colburn LLP

(57) ABSTRACT

A rare earth magnet may include a formed body having magnetic powder containing rare earth metal, the formed body being magnetized, a coating film which is formed on an outer face of the formed body, and a rust preventive treatment layer which is formed on a surface of the magnetic powder in a pore of the formed body. In a manufacturing method for a rare earth magnet, a forming step is performed in which a formed body having magnetic powder containing rare earth metal is formed, after that, a coating film forming step is performed in which a coating film is formed on an outer face of the formed body and, after that, a rust prevention processing step is performed in which rust preventive liquid is impregnated into the formed body.

8 Claims, 2 Drawing Sheets

(51) Int. Cl.
*H02K 1/27* (2006.01)
*H02K 1/02* (2006.01)
*H02K 1/04* (2006.01)

(52) U.S. Cl.
CPC .............. *H02K 1/02* (2013.01); *H02K 1/04* (2013.01); *H02K 1/27* (2013.01); *H02K 1/2733* (2013.01)

(56) References Cited

U.S. PATENT DOCUMENTS

| | | | |
|---|---|---|---|
| 6,555,051 B1 * | 4/2003 | Sakata | B22F 3/20 419/37 |
| 7,164,216 B2 * | 1/2007 | Shimoyama | 310/49.32 |
| 2010/0289366 A1 * | 11/2010 | Komuro et al. | 310/156.01 |

* cited by examiner

RARE EARTH MAGNET, ROTOR AND MANUFACTURING METHOD FOR RARE EARTH MAGNET

CROSS REFERENCE TO RELATED APPLICATION

The present invention claims priority under 35 U.S.C. §119 to Japanese Application No. 2013-112250 filed May 28, 2013, the entire content of which is incorporated herein by reference.

FIELD OF THE INVENTION

At least an embodiment of the present invention may relate to a rare earth magnet, a rotor using the rare earth magnet, and a manufacturing method for the rare earth magnet.

BACKGROUND

A rare earth magnet has been used in various technical fields. For example, a stepping motor includes a rotor, which is provided with a permanent magnet made of a rare earth magnet on an outer peripheral face of a rotation shaft, and a cylindrical stator in which a plurality of pole teeth facing an outer peripheral face of the permanent magnet is disposed in a circumferential direction, and a rotation angular position of the rotor is controlled by an exciting current which is supplied to a coil of the stator.

A permanent magnet made of such a rare earth magnet is obtained, for example, so that a formed body including magnetic powder which contain rare earth metal is formed and then the formed body is magnetized. Further, in the rare earth magnet, a bond magnet has a structure in which magnetic powder is solidified by binder resin, and a sintered magnet has a structure in which magnetic powder is solidified by sintering.

A magnet (Nd—Fe—B) which uses neodymium among rare earth metals is provided with extremely superior property as a magnet but is apt to rust. When magnetic powder of rare earth metal is rusted and dropped off, the rare earth magnet may be collapsed.

Therefore, a technique in which a coating film is formed on a formed body to prevent occurrence of rust and a technique in which rust preventive liquid is impregnated into a formed body to prevent occurrence of rust have been proposed (see Japanese Patent No. 2879645 and Japanese Patent Laid-Open No. Hei 11-238611).

A rare earth magnet which is formed by compression molding is provided with a large number of pores and rare earth metal is exposed on an outer face of the rare earth magnet and on the pores in the inside of the rare earth magnet. Therefore, even when a coating film is formed on an outer face of a formed body, the coating film may not be formed in the inside of the pore and, in this case, the rare earth metal may be rusted in the inside of the pore.

Further, in the rare earth magnet, even in a case that rust preventive material is impregnated, when powder of rare earth metal (magnetic powder) is dropped off from the surface of the formed body, rust may occur on a newly exposed powder of the rare earth metal.

SUMMARY

In view of the problems described above, at least an embodiment of the present invention may advantageously provide a rare earth magnet which is capable of effectively suppressing occurrence of rust, a rotor using the rare earth magnet, and a manufacturing method for the rare earth magnet.

According to at least an embodiment of the present invention, there may be provided a rare earth magnet including a formed body having magnetic powder containing rare earth metal, the formed body being magnetized, a coating film which is formed on an outer face of the formed body, and a rust preventive treatment layer which is formed on a surface of the magnetic powder in a pore of the formed body. Specifically, it is preferable that the formed body is structured by compression molding, and a large number of pores is formed on a surface of the formed body, the pores formed on an outer face of the formed body is covered by the coating film, and a coating failure portion of the pore on the outer face of the formed body is covered by a rust preventive treatment layer which is formed by impregnation of rust preventive liquid.

In at least an embodiment of the present invention, a coating film for preventing rust is formed on an outer face of the formed body and thus occurrence of rust on the outer face is suppressed. Further, the magnetic powder is prevented from dropping off from the outer face of the formed body by the coating film. Further, a large number of pores is formed in the formed body and there may be occurred that the coating film is not formed in an inside of the pore. Further, when a pin hole exists in the coating film, moisture and air may enter into the inside of the pore through the pin hole. Even in these cases, according to at least an embodiment of the present invention, a rust preventive treatment layer is formed on a surface of the magnetic powder in the pore and thus occurrence of rust is suppressed in the inside of the pore.

In at least an embodiment of the present invention, the magnetic powder is solidified by binder resin in the formed body.

In at least an embodiment of the present invention, the coating film is made of a resin film containing fluorine. According to this structure, the coating film has water repellency and thus occurrence of rust is suppressed effectively. Specifically, the formed body is structured by compression molding, and a large number of pores are formed on a surface of the formed body, the coating film contains at least one kind selected from epoxy resin, phenol resin and polyester resin, and fluororesin of 2-70 wt. %, and the rust preventive treatment layer is formed on a coating failure portion on the pore on an outer face of the formed body which is left after the coating film is formed.

In at least an embodiment of the present invention, the thickness of the coating film is set in a range from 3 µm to 8 µm. In a case that a film thickness is set to be thin as described above, when the rare earth magnet in accordance with at least an embodiment of the present invention is used as a rotor magnet for a motor, an outer diameter dimension of the formed body of the rare earth magnet is not required to be made smaller for securing a space (air gap) between the rotor and the stator. Therefore, even when the coating film is provided on the rare earth magnet, the coating film is hard to affect the magnetic characteristics of the rotor magnet.

In at least an embodiment of the present invention, a mixing ratio of the binder resin in the formed body is 1.5-3.5 wt. %.

In at least an embodiment of the present invention, the formed body is formed in a cylindrical shape in which a through hole penetrating through the formed body is formed, the through hole includes a first portion extended so as to have the same inner diameter and a second portion which is enlarged from the first portion at least at one end part of the first portion, and the coating film is formed on an outer peripheral face of the formed body and end faces of the formed body located at end parts in a penetrating direction of the through hole and the coating film is not formed on an inner face of the first portion of the through hole. According to this structure, the inner diameter of the first portion is not affected by the coating film and thus the rotation shaft is appropriately fitted into the through hole.

In this case, it is preferable that the coating film is not formed on an inner face of at least a part of the second portion of the through hole which is adjacent to the first portion. According to this structure, when the rotation shaft fitted into the through hole and the rare earth magnet are fixed to each other by an adhesive provided in the second portion, an adhesive strength of the adhesive is large to a portion of the second portion where the coating film is not formed. Therefore, the rotation shaft and the rare earth magnet are fixed to each other strongly.

A rotor including the rare earth magnet in accordance with at least an embodiment of the present invention includes a rotation shaft which is fitted into the through hole and the rotation shaft is adhesively fixed to the through hole.

A manufacturing method for a rare earth magnet in accordance with at least an embodiment of the present invention includes a forming step in which a formed body having magnetic powder containing rare earth metal is formed, a coating film forming step in which a coating film is formed on an outer face of the formed body, and a rust prevention processing step in which rust preventive liquid is impregnated into the formed body.

In at least an embodiment of the present invention, in the forming step, the formed body is compression molded so that a porosity ratio in an inside of the formed body is 12-14 vol. %. Further, in at least an embodiment of the present invention, in the forming step, the formed body is compression molded so that a density in an inside of the formed body is 5.7 g/cm$^3$ or more.

In at least an embodiment of the present invention, in the coating film forming step, the coating film is formed by a barrel coating method. In the barrel coating method, a coating film is formed while a container is rotated in a state that a large number of the formed bodies is accommodated in the container. Therefore, coating is efficiently performed on a large number of the formed bodies. Further, the formed bodies move in an inside of the container and thus the formed bodies do not stick to each other. Further, when the formed body is formed in a cylindrical shape, an inner face of the through hole is hard to be coated and thus the coating film is suppressed from being unnecessarily formed on the inner face of the through hole. In addition, since the growth rate of the coating film is slow, a film thickness of the coating film is easily controlled.

In at least an embodiment of the present invention, in the rust prevention processing step, the rust preventive liquid is impregnated into the formed body under a vacuum environment. Specifically, the formed body is structured by compression molding, and a large number of pores is formed on a surface of the formed body, the coating film which is formed in the coating film forming step contains at least one kind selected from epoxy resin, phenol resin and polyester resin, and fluororesin of 2-70 wt. % and, in the rust prevention processing step after the coating film forming step, a rust preventive treatment layer is formed on a coating failure portion on an outer face of the formed body which is left in the coating film forming step.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A rare earth magnet, a rotor and a motor to which at least an embodiment of the present invention is applied will be described below with reference to the accompanying drawings. In the following description, a side where a rotation shaft is protruded is referred to as an "output side "L1"" and an opposite side to the side where the rotation shaft is protruded is referred to as an "opposite-to-output side "L2"" in a motor axial line direction "L".

[Description of Motor]

Figure 1:
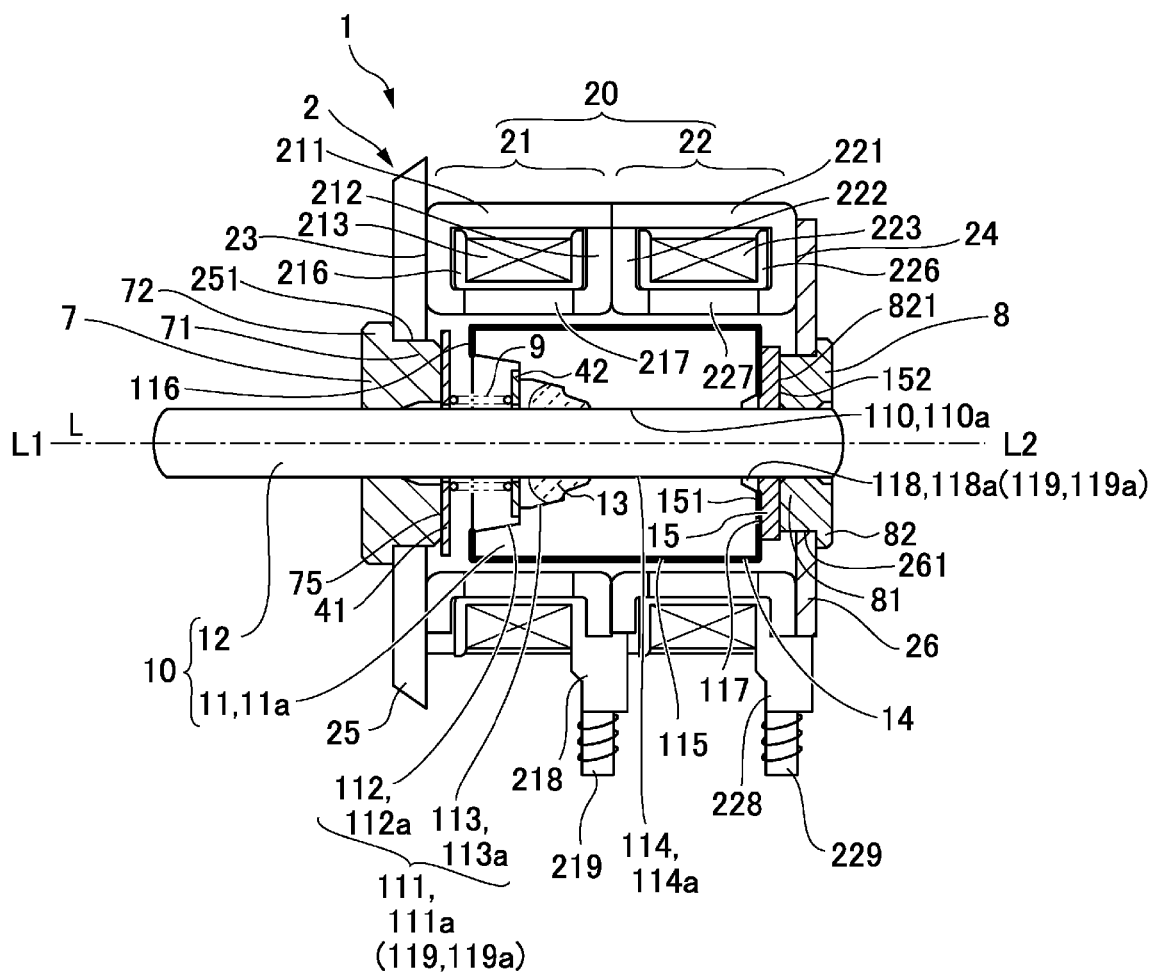
FIG. 1 is a cross-sectional view showing a stepping motor provided with a rare earth magnet and a rotor to which at least an embodiment of the present invention is applied.

FIG. 1 is a cross-sectional view showing a stepping motor provided with a rare earth magnet and a rotor to which at least an embodiment of the present invention is applied.

As shown in FIG. 1, a stepping motor 1 in this embodiment includes a rotor 10 having a permanent magnet 11 on an outer peripheral face of a rotation shaft 12 and a fixed body 2 having a cylindrical stator 20 which faces an outer peripheral face of the permanent magnet 11. An "N"-pole and an "S"-pole are alternately disposed on an outer peripheral face 115 of the permanent magnet 11 in a circumferential direction. The permanent magnet 11 is formed with a through hole 110 which penetrates through the permanent magnet 11 in the motor axial line direction "L". The permanent magnet 11 and the rotation shaft 12 are fixed to each other in a state that the rotation shaft 12 is fitted to the through hole 110.

The stator 20 includes a pair of stator assemblies 21 and 22 which are disposed so as to be superposed on each other in the motor axial line direction "L". The respective stator assemblies 21 and 22 include coils 213 and 223 wound around insulators 216 and 226 and stator cores 211, 212, 221 and 222 which are disposed on both sides of the insulators 216 and 226 in the motor axial line direction "L". The stator core 211 is an outer stator core covering a face on the output side "L1" of the insulator 216 and the stator core 212 is an inner stator core covering a face on the opposite-to-output side "L2" of the insulator 216. The stator core 221 is an outer stator core covering a face on the opposite-to-output side "L2" of the insulator 226 and the stator core 222 is an inner stator core covering a face on the output side "L1" of the insulator 216. The stator cores 211 and 221 are formed in a "U"-shape in cross section and a motor case is structured of a tube-shaped part on their outer peripheral sides.

In the stator 20, respective stator cores 211, 212, 221 and 222 are provided with a plurality of pole teeth 217 and 227 which are stood up along inner peripheral faces of the insulators 216 and 226. In a state that the stator assembly 21 is structured, the pole teeth 217 formed in the stator core 211 are interposed between the pole teeth 217 formed in the stator core 212, and the pole teeth 217 formed in the stator core 211 and the pole teeth 217 formed in the stator core 212 are alternately disposed in a circumferential direction. Further, in a state that the stator assembly 22 is structured, the pole teeth 227 formed in the stator core 221 are interposed between the pole teeth 227 formed in the stator core 222, and the pole teeth 227 formed in the stator core 221 and the pole teeth 227 formed in the stator core 222 are alternately disposed in the circumferential direction.

Terminal blocks 218 and 228 are integrally formed in the insulators 216 and 226 and terminals 219 and 229 are fixed to the terminal blocks 218 and 228. In the stator 20 of the fixed body 2, an output side end plate 25 is fixed to an end face 23 on the output side "L1" and an opposite-to-output side end plate 26 is fixed to an end face 24 on the opposite-to-output side "L2".

(Bearing Structure)

In this embodiment, an output side radial bearing 7 which rotatably supports the rotation shaft 12 on the output side "L1" is held by utilizing the output side end plate 25 and the output side radial bearing 7 rotatably supports a portion of the rotation shaft 12 located on the output side "L1" with respect to the permanent magnet 11. More specifically, a hole 251 is formed in the output side end plate 25 and the output side radial bearing 7 is held by the output side end plate 25 in a fitted state into the hole 251. The output side radial bearing 7 is provided with a tube part 71 which is fitted into the hole 251 and a flange part 72 which is enlarged from the tube part 71 on the output side "L1" and is provided with a larger diameter than the tube part 71. The output side radial bearing 7 is fixed to the output side end plate 25 by caulking an outer side edge of the tube part 71, which is further protruded to the opposite-to-output side "L2" with respect to a face on the opposite-to-output side "L2" of the output side end plate 25, with a face on the opposite-to-output side "L2" of the output side end plate 25 in a state that a face on the opposite-to-output side "L2" of the flange part 72 is overlapped with a face on the output side "L1" of the output side end plate 25. The output side radial bearing 7 is made of an oil-impregnated sintered bearing.

An opposite-to-output side radial bearing 8 which rotatably supports the rotation shaft 12 on the opposite-to-output side "L2" is held by utilizing the opposite-to-output side end plate 26 and the opposite-to-output side radial bearing 8 rotatably supports a portion of the rotation shaft 12 which is located on the opposite-to-output side "L2" with respect to the permanent magnet 11. More specifically, a hole 261 is formed in the opposite-to-output side end plate 26 and the opposite-to-output side radial bearing 8 is held by the opposite-to-output side end plate 26 in a fitted state into the hole 261. The opposite-to-output side radial bearing 8 is provided with a tube part 81 which is fitted into the hole 261 and a flange part 82 which is enlarged from the tube part 81 on the opposite-to-output side "L2" and is provided with a larger diameter than the tube part 81. The opposite-to-output side radial bearing 8 is fixed to the opposite-to-output side end plate 26 by caulking an outer side edge of the tube part 81, which is further protruded to the output side "L1" with respect to a face on the output side "L1" of the opposite-to-output side end plate 26, with a face on the output side "L1" of the opposite-to-output side end plate 26 in a state that a face on the output side "L1" of the flange part 82 is overlapped with a face on the opposite-to-output side "L2" of the opposite-to-output side end plate 26. The opposite-to-output side radial bearing 8 is made of an oil-impregnated sintered bearing.

(Structure of Urging Member and the like)

In the stepping motor 1, an urging member 9 for urging the rotation shaft 12 to the opposite-to-output side "L2" is disposed between the output side radial bearing 7 and the rotor 10. In this embodiment, the urging member 9 is made of a coiled spring and is disposed around the rotation shaft 12. In order to arrange the urging member 9 (coiled spring), in this embodiment, an end part on the opposite-to-output side "L2" of the urging member 9 is accommodated in an inside of a ring-shaped recessed part 111 of the permanent magnet 11. A ring-shaped washer 41 attached to the rotation shaft 12 is disposed between an end part on the output side "L1" of the urging member 9 and an end face 75 on the opposite-to-output side "L2" of the output side radial bearing 7, and a ring-shaped washer 42 attached to the rotation shaft 12 is disposed between an end part on the opposite-to-output side "L2" of the urging member 9 and a step part of the ring-shaped recessed part 111.

Further, in the stepping motor 1 in this embodiment, a washer 15 is attached to a portion of the rotation shaft 12 which is located between the permanent magnet 11 and the opposite-to-output side radial bearing 8, and a face 151 on the output side "L1" of the washer 15 is contacted with an end face 117 on the opposite-to-output side "L2" of the permanent magnet 11. The end face 117 on the opposite-to-output side "L2" of the permanent magnet 11 is formed with a recessed part 118 so as to surround the rotation shaft 12, and a face 151 on the output side "L1" of the washer 15 is contacted with the end face 117 on the opposite-to-output side "L2" of the permanent magnet 11 on an outer side in the radial direction with respect to the recessed part 118. An outer diameter dimension of the washer 15 is smaller than an outer diameter dimension of the permanent magnet 11. A metal member may be used as the washer 15 and a member made of resin may be used. In this embodiment, the washer 15 is made of resin.

A face 152 on the opposite-to-output side "L2" of the washer 15 is contacted with a face 821 on the output side "L1" of the opposite-to-output side radial bearing 8 and the face 152 on the opposite-to-output side "L2" of the washer 15 is elastically pressed against the face 821 on the output side "L1" of opposite-to-output side radial bearing 8 by an urging force of the urging member 9.

(Structure of Permanent Magnet 11)

The permanent magnet 11 is a rare earth magnet which is structured by compression molding so that a formed body 11a including magnetic powder (Nd—Fe—B) containing rare earth metal such as neodymium is magnetized. Further, in this embodiment, the permanent magnet 11 is a bond magnet in which magnetic powder containing rare earth metal is solidified with binder resin such as epoxy resin. The magnetic powder is exposed on the surface of the formed body 11a. Further, a plurality of pores is formed in the inside of the formed body 11a and the magnetic powder is also exposed in the inside of the pore. In other words, the magnetic powder is exposed in the inside of the pore which is formed on the surface of the formed body 11a.

In this embodiment, a porosity ratio of the pore in the inside of the formed body 11a is 12-14 vol. % before rust preventive liquid is impregnated. Further, a mixing ratio of binder resin in the formed body 11a is 1.5-3.5 wt. % by weight of the magnetic powder. Further, in this embodiment, mixed magnetic powder whose particle diameter is about 75-150 μm is utilized as the magnetic powder. However, the present invention is not limited to this embodiment and, for example, only magnetic powder having the same particle diameter may be utilized.

A mixing ratio of the binder resin may be changed according to a required amount of magnetic flux. Therefore, in a case that an amount of relatively weak magnetic flux is required, a mixing ratio of the binder resin is set to be higher (larger amount) and, in a case that an amount of relatively strong magnetic flux is required, a mixing ratio of the binder resin is set to be lower (smaller amount).

The permanent magnet 11 (formed body 11a) is provided with a cylindrical shape which is formed with a through hole 110 extended in a motor axial line direction "L". The through hole 110 is formed of a first portion 114 extended so as to have the same inside diameter and two second portions 119 which are enlarged from the first portion 114 on both sides of the first portion 114. A ring-shaped recessed part 118 surrounding the rotation shaft 12 is formed by the second portion 119 located on the opposite-to-output side "L2", and a ring-shaped recessed part 111 is formed by the second portion 119 located on the output side "L1". The ring-shaped recessed part 111 is formed in a stepped hole which is enlarged stepwise toward the output side "L1" and a small diameter portion 113 on the opposite-to-output side "L2" of the ring-shaped recessed part 111 is filled with an adhesive 13 for fixing the rotation shaft 12 and the permanent magnet 11 to each other. Further, a step part which is formed between the small diameter portion 113 on the opposite-to-output side "L2" of the ring-shaped recessed part 111 and its large diameter portion 112 on the output side "L1" supports a washer 42.

(Rust Measures)

The formed body 11a of the permanent magnet 11 structured as described above is formed with a coating film 14 for preventing rust. Further, the formed body 11a is structured by compression molding and thus pores having various sizes are formed on its surface. In this embodiment, the coating film 14 for preventing rust is formed of resin by a barrel coating method and thus the resin is easily entered into a large pore to form the coating film but is hard to be entered into a small pore. Therefore, a portion where the rust preventive coating film 14 is not formed, a pore on the surface of the formed body 11a where the coating film 14 is not formed, and a pore in the inside of the formed body 11a are formed with a rust preventive treatment layer (not shown) on the surface of the magnetic powder by rust preventive liquid which is impregnated into the formed body 11a. In FIG. 1, the coating film 14 is shown by a thick line.

In this embodiment, the thickness of the coating film 14 is, for example, from 3 µm to 8 µm and it is thin. The coating film 14 is a fluorine containing resin film which contains fluorine and the coating film 14 has water repellency. More specifically, the coating film 14 contains at least one kind selected from epoxy resin, phenol resin and polyester resin, and fluororesin of 2-70 wt. % and the coating film 14 has water repellency. In this embodiment, the coating film 14 contains phenol-epoxy resin and fluororesin. The fluorine resin is a tetrafluoroethylene resin (PTFE), a tetrafluoroethylene-perfluoro alkoxy ethylene copolymer resin (PFA), a tetrafluoroethylene-hexafluoropropylene copolymer resin (FEP), a tetrafluoroethylene-hexafluoropropylene-perfluoro alkoxy ethylene copolymer resin (EPE), a tetrafluoroethylene-ethylene copolymer resin (ETFE), a trifluorochloroethylene copolymer resin (PCTFE), a trifluorochloroethylene-ethylene copolymer resin (ECTFE), a vinylidene fluoride resin (PVDF), or a vinyl fluoride resin (PVE).

The rust preventive liquid is a solution obtained by diluting rust preventive material containing a phthalic ester or an adipic acid ester with organic solvent such as a xylene, a mineral spirit or a mineral oil. After the rust preventive liquid is impregnated into the formed body 11a, when the formed body 11a is dried, a rust preventive treatment layer is formed. The rust preventive liquid enters into a portion where the coating film 14 is not formed in the formed body 11a or a pore formed in the inside of the formed body 11a through a pinhole which is occurred in the coating film 14. Therefore, when the organic solvent is evaporated from the rust preventive liquid, a rust preventive treatment layer is formed on a surface of the magnetic powder exposed in a pore in the inside of the formed body 11a. Accordingly, the magnetic powder is blocked from contacting with moisture and air and thus occurrence of rust (oxidation) is suppressed. In this embodiment, the rust preventive liquid is a solution obtained by diluting rust preventive material containing a phthalic ester or the like with organic solvent and an inhibitor such as a chelating agent may be included.

The coating film 14 is formed on an outer peripheral face 115 of the formed body 11a and end faces 116 and 117 located at end parts in a penetrating direction of the through hole 110. However, the coating film 14 is not formed on an inner face 114a of the first portion 114 of the through hole 110. Further, the coating film 14 is not formed on at least an inner face of a portion adjacent to the first portion 114 in the inner face 119a of the second portion 119 of the through hole 110. In other words, the coating film 14 is not formed on at least the inner face 113a of the small diameter portion 113 in the inner face 111a of the ring-shaped recessed part 111 of the through hole 110, and the coating film 14 is not formed on at least a portion adjacent to the first portion 114 in the inner face 118a of the ring-shaped recessed part 118 of the through hole 110.

The coating film 14 may be formed on the inner face 112a of the large diameter portion 112 and the inner face 118a of the ring-shaped recessed part 118 in the inner face 110a of the through hole 110. However, in this embodiment, the coating film 14 is formed only on the outer face of the formed body 11a (outer peripheral face 115 and end faces 116 and 117) and is not formed on the inner face of the through hole 110 (inner face 114a of first portion 114 and inner face 119a of second portion 119).

(Manufacturing Method for Permanent Magnet 11)

Figure 2:
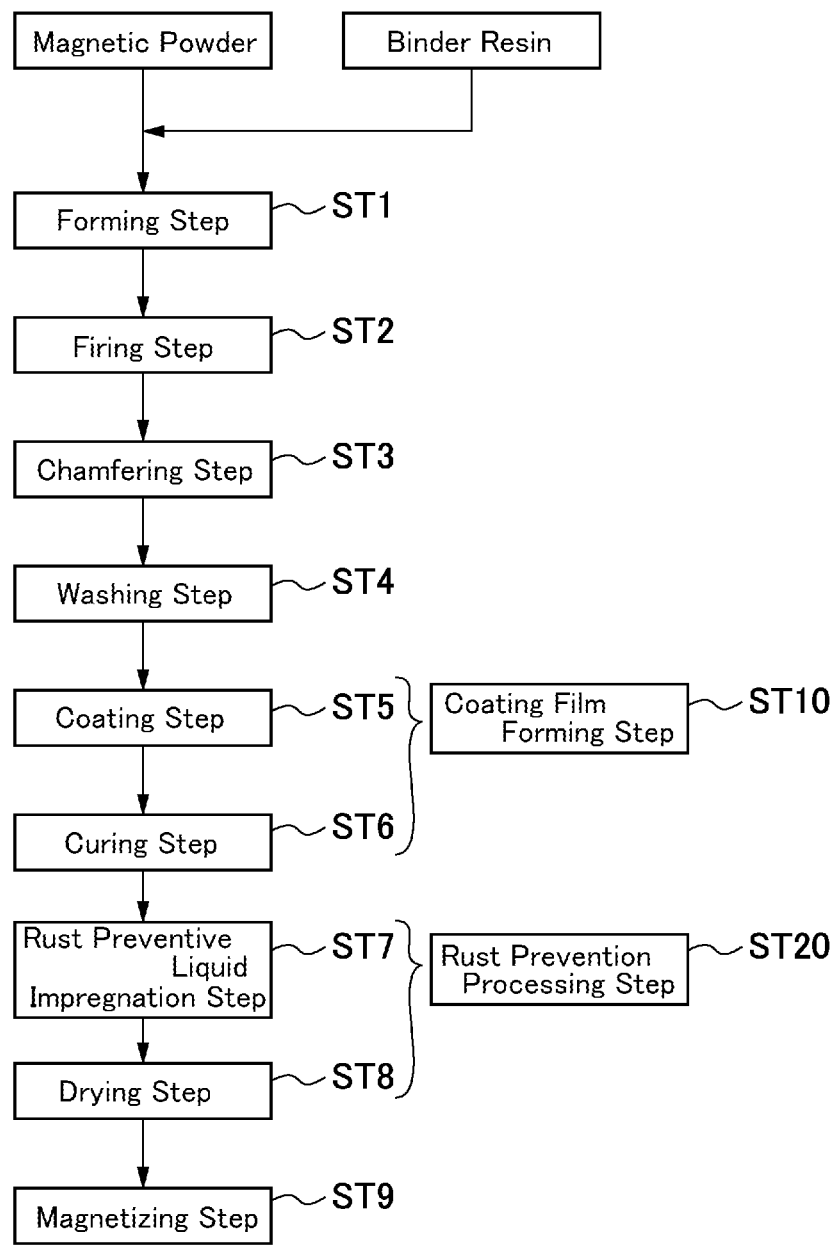
FIG. 2 is a step chart showing a manufacturing method for a permanent magnet to which at least an embodiment of the present invention is applied.

FIG. 2 is a step chart showing a manufacturing method for the permanent magnet 11 to which at least an embodiment of the present invention is applied.

As shown in FIG. 2, in order to manufacture the permanent magnet 11 in this embodiment, first, in the forming step "ST1", magnetic powder and binder resin are mixed and then compression molded in a shape shown in FIG. 1 to obtain a formed body 11a in a cylindrical shape. In this embodiment, a mixing ratio of the binder resin in the formed body 11a is set to be 1.5-3.5 wt. % in a magnetic powder weight ratio so as to match with a required specification. Further, compression molding is performed so that an internal density of the formed body 11a is set in a state of 5.7 g/cm³ or more and, as a result, a porosity ratio in the inside of the formed body 11a is set to be 12-14 vol. %.

Next, in the firing step "ST2", the formed body 11a is sintered and the formed body 11a is formed to be a sintered compact of the magnetic powder. Next, a chamfering step "ST3" is performed on the formed body 11a by utilizing a barrel or the like and, after that, a washing step "ST4" is performed by using a nonaqueous solvent such as isopropyl alcohol. In the chamfering step "ST3", a large number of formed bodies 11a is accommodated in a container together with media such as ceramic balls of φ3 mm through φ10 mm and, in this state, the container is rotated to chamfer the formed body 11a by contacting the formed body 11a with the media. As a result, a burr of the formed body 11a is also removed. After that, the formed body 11a is dried under a condition that the temperature is 100° C. The chamfering step "ST3" may be performed in a wet type or may be performed in a dry type.

Next, a coating film 14 is formed on the formed body 11a in a coating film forming step "ST10". In the coating film forming step "ST10", first, a coating film 14 is formed in the coating step "ST5" and then, in a curing step "ST6", the coating film 14 is heated and cured. In this embodiment, the coating film 14 is formed by a barrel coating method in the coating film forming step "ST10" (coating step "ST5"). In the barrel coating method, while rotating a container in a state that a large number of formed bodies 11a is accommodated in the container, coating liquid is discharged from a nozzle toward the formed bodies 11a to form the coating film 14.

Further, a following method may be adopted in the coating step "ST5". First, while rotating a container in a state that a large number of formed bodies 11a is accommodated in the container, coating liquid is discharged from a nozzle toward the formed bodies 11a to form a coating film 14 having a thickness of about 6 μm. In this case, media are not put into the container. Next, after media are put into the container, the container is rotated until the coating film 14 which has been previously formed is almost removed. As a result, the coating film 14 is almost removed from the surface of the formed body 11a but the pores exposed on the outer face of the formed body 11a is filled with the coating film 14. Next, while rotating the container in a state that a large number of the formed bodies 11a is accommodated in the container, coating liquid is discharged from the nozzle toward the formed bodies 11a to form a coating film 14 having a thickness of 3 μm through 8 μm. In this case, media are not put into the container. In a case that a pore exposed on an outer face of the formed body 11a is large, when the pore is not filled with the coating film 14, it is difficult that the pore is buried by impregnation of the rust preventive liquid or that a pin hole is not formed in the coating film 14. In order to prevent this problem, it is preferable that the large pore is filled by forming a first coating film and, after that, a newly applied coating film 14 is formed on the outer face of the formed body 11a including left pores. According to this method, occurrence of rust on the outer face of the formed body 11a is surely prevented by the newly applied coating film 14 whose thickness is set in a range from 3 μm to 8 μm and by impregnation of the rust preventive liquid.

Next, a rust preventive treatment layer is formed on the formed body 11a in a rust prevention processing step "ST20". A large number of pores is formed on the surface of the formed body 11a structured by compression molding and thus, in a case that the coating film 14 is formed by a barrel coating method, it is difficult that no pore on which coating is not formed is left on the surface of the formed body 11a. When the film thickness of the coating film 14 is increased, the number of the pores where the coating film 14 is not formed may be reduced. However, even when the film thickness of the coating film 14 is increased, it is difficult to completely eliminate the portion where the coating film 14 is not formed. Further, when the film thickness of the coating film 14 is increased, a space between the magnetic powder of the magnet and the stator is enlarged by the film thickness of the coating film 14 and thus it is not desirable. In this embodiment, rust prevention treatment processing by rust preventive liquid is performed after the coating film 14 is formed so that occurrence of rust is surely prevented without increasing the film thickness of the coating film 14. In the rust prevention processing step "ST20", first, the formed body 11a is impregnated with rust preventive liquid in the rust preventive liquid impregnation step "ST7" and, after that, solvent of the rust preventive liquid is evaporated in a drying step "ST8" to form a rust preventive treatment layer on the formed body 11a. In the rust preventive liquid impregnation step "ST7", vacuum impregnation is performed in which the formed body 11a is impregnated with the rust preventive liquid under a vacuum environment.

Next, a magnetizing step "ST9" is performed and the permanent magnet 11 is completed.

(Principal Effects in this Embodiment)

As described above, the permanent magnet 11 (rare earth magnet) which is a compression molded magnet in this embodiment is formed with the coating film 14 for preventing rust on the outer face (outer peripheral face 115 and end faces 116 and 117) of the formed body 11a and thus occurrence of rust is suppressed on the outer face (outer peripheral face 115 and end faces 116 and 117) of the formed body 11a. Further, the magnetic powder is prevented from dropping off from the outer face of the formed body 11a by the coating film 14. Further, a magnet structured by compression molding is formed with a large number of pores on its surface and thus, when the film thickness of the coating film 14 is set to be thinner, a portion where the coating film is not formed on the pore on the surface may be easily occurred. However, in this embodiment, a rust preventive treatment layer is formed by impregnation of rust preventive liquid after the coating film 14 is formed and thus a rust preventive treatment layer is formed on the pore left on the surface of the formed body 11a without being formed with the coating film and the surface of the magnetic powder in the pore in the inside of the formed body 11a. Therefore, occurrence of rust is prevented on the outer face of the permanent magnet 11 in this embodiment. Further, when a pin hole exists in the coating film 14, moisture or air enters into the pore through the pin hole. Even in this case, a rust preventive treatment layer is formed on the surface of the magnetic powder in the pore and thus the inside of the pore is suppressed from occurring of rust. Further, the coating film 14 is made of a resin film containing fluorine and thus the coating film 14 has water repellency. Therefore, occurrence of rust can be suppressed effectively.

For example, a shelf test for 3000 hours was performed on the permanent magnet 11 under the environment with the temperature of 60° C. and the humidity of 90% and, as a result, rust did not occur on the outer face of the permanent magnet 11 in this embodiment. In addition, after salt water of 0.5 wt. % was stuck to the permanent magnet 11, a shelf test for 72 hours was performed under the environment with the temperature of 60° C. and the humidity of 90%. As a result, occurrence of rust was confirmed in a sample on which only the coating film 14 was formed but the rust prevention processing by impregnation of the rust preventive liquid was not performed and a sample on which the rust prevention processing by the rust preventive liquid was performed but the coating film 14 was not formed. However, in the permanent magnet 11 in this embodiment on which both of formation of the coating film 14 and the rust prevention processing were performed, rust was not occurred.

Further, in this embodiment, the thickness of the coating film 14 is 3 μm through 8 μm and thin. Therefore, a dimension in a radial direction of the permanent magnet 11 is not required to reduce by the thickness of the coating for securing an air gap between the stator 20 (pole teeth 217 and 227 formed in the stator cores 211, 212, 221 and 222) and the permanent magnet 11 and thus magnetic characteristics are hardly affected due to the air gap. When the film thickness of the coating film 14 is set to be thinner like this embodiment, a portion where the coating film is not formed on a pore on the surface of the permanent magnet 11 may be easily occurred. However, in this embodiment, since rust preventive liquid is impregnated after the coating film 14 is formed, a rust preventive treatment layer is formed on the pore which is left without being formed with the coating film and thus occurrence of rust on the outer face of the permanent magnet 11 is suppressed surely. Further, it is not required that the film thickness of the coating film 14 is increased so as not to occur a portion where the coating film is not formed on the pore of the surface and thus an outer peripheral face of the permanent magnet 11 (outer peripheral face formed by the magnetic powder) can be made close to the stator 20 (pole teeth 217 and 227 formed in the stator cores 211, 212, 221 and 222).

Further, the coating film 14 is hard to be formed on the inner face 114a of the first portion 114 of the through hole 110 of the formed body 11a. Therefore, a dimension of the inside diameter of the first portion 114 is not affected by the coating film and thus the rotation shaft 12 is appropriately fitted to the through hole 110. In other words, when the coating film 14 is thickly formed on the inner face 114a of the first portion 114, a state may occur that the rotation shaft 12 is not inserted into the through hole 110. However, according to this embodiment, the state is hard to occur.

Further, the coating film 14 is hard to be formed at least on the inner face of the portion adjacent to the first portion 114 in the inner face 119a of the second portion 119 of the through hole 110. Therefore, when the rotation shaft 12 fitted to the through hole 110 and the permanent magnet 11 (rare earth magnet) are to be fixed to each other by an adhesive 13 which is provided in the small diameter portion 113 of the second portion 119 on the output side "L1", the adhesive 13 is easily entered to the innermost part of the small diameter portion 113. Therefore, an adhesive strength between the small diameter portion 113 and the adhesive 13 is large and thus the rotation shaft 12 and the permanent magnet 11 (rare earth magnet) are fixed to each other strongly. Especially, in this embodiment, the coating film 14 having water repellency is formed. Although an adhesive strength between the adhesive 13 and the coating film 14 having water repellency is low, in this embodiment, the rotation shaft 12 and the permanent magnet 11 are fixed to each other with the adhesive 13 at a portion where the coating film 14 is not formed and thus the rotation shaft 12 and the permanent magnet 11 (rare earth magnet) are fixed to each other strongly.

Further, in this embodiment, when the permanent magnet 11 is to be manufactured, the coating film 14 is formed by the barrel coating method in the coating film forming step "ST10". In the barrel coating method, the coating film 14 is coated while rotating a container in a state that a large number of the formed bodies 11a is accommodated in the container. Therefore, coating is efficiently performed on a large number of the formed bodies 11a. Further, the formed bodies 11a move in the inside of the container and thus the formed bodies 11a do not stick to each other. Further, in a case that the barrel coating method is applied when the formed body 11a is formed in a cylindrical shape, an inner face of the through hole 110 is hard to be coated and thus the coating film 14 is suppressed from being unnecessarily formed on the inner face 110a of the through hole 110. In addition, in the barrel coating method, since the growth rate of the coating film 14 is slow, a film thickness of the coating film 14 is easily controlled.

[Other Embodiments]

In the embodiment described above, as an example, the present invention is applied to the permanent magnet 11 which is a bond magnet (rare earth magnet). However, at least an embodiment of the present invention may be applied to a permanent magnet 11 which is a sintered magnet (rare earth magnet).

In the embodiment described above, the coating film 14 is not formed on the inner face 110a of the through hole 110. However, the coating film 14 may be stuck to a part of the inner face 110a of the through hole 110. It is preferable that the coating film 14 is formed on the end faces 116 and 117 in addition to the outer peripheral face 115 of the formed body 11a in consideration of preventing occurrence of rust in the permanent magnet 11. In order to surely realize this state, the coating film 14 may be stuck to a part of the inner face 110a of the through hole 110 such as an opening edge or its vicinity of the through hole 110. Even in this case, the coating film 14 may be stuck to the inner face 110a of the through hole 110 if there causes no trouble in insertion of the rotation shaft 12 into the through hole 110 and in fixing by the adhesive 13.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A manufacturing method for a rare earth magnet, comprising:
    forming a formed body comprising magnetic powder containing rare earth metal;
    forming a coating film made of resin film for preventing rust on an outer face of the formed body;
    after forming the coating film, impregnating rust preventive liquid, obtained by diluting rust preventive material containing a phthalic ester or an adipic acid ester with organic solvent, into the formed body; and then
    evaporating the organic solvent from the rust preventive liquid to form a rust preventive treatment layer, different from the coating film, in the formed body.

2. The manufacturing method for a rare earth magnet according to claim 1, wherein, the formed body is compression molded so that a porosity ratio in an inside of the formed body is 12-14 vol. %.

3. The manufacturing method for a rare earth magnet according to claim 1, wherein, the formed body is compression molded so that a density in an inside of the formed body is 5.7 g/cm$^3$ or more.

4. The manufacturing method for a rare earth magnet according to claim 1, wherein, the coating film is formed by a barrel coating method.

5. The manufacturing method for a rare earth magnet according to claim 4, wherein, the rust preventive liquid is impregnated into the formed body under a vacuum environment.

6. The manufacturing method for a rare earth magnet according to claim 5, wherein
- the formed body is structured by compression molding, and a large number of pores are formed on a surface of the formed body,
- the coating film contains at least one resin selected from epoxy resin, phenol resin and polyester resin, and fluororesin of 2-70 wt. %, and
- the rust preventive treatment layer is formed on a coating failure portion of the coating film on an outer face of the formed body.

7. The manufacturing method for a rare earth magnet according to claim 1, wherein, the rust preventive liquid is impregnated into the formed body under a vacuum environment.

8. The manufacturing method for a rare earth magnet according to claim 1, wherein
- the formed body is structured by compression molding, and a large number of pores are formed on a surface of the formed body,
- the coating film contains at least one resin selected from epoxy resin, phenol resin, and polyester resin, and fluororesin of 2-70 wt. %; and
- the rust preventive treatment layer is formed on a coating failure portion of the coating film on an outer face of the formed body.

* * * * *